United States Patent
Cavallo et al.

(10) Patent No.: US 10,775,879 B1
(45) Date of Patent: Sep. 15, 2020

(54) LOCOMOTION IN VIRTUAL REALITY DESK APPLICATIONS

(71) Applicant: INTERNATIONAL BUSINESS MACHINES CORPORATION, Armonk, NY (US)

(72) Inventors: Marco Cavallo, New York, NY (US); Aldis Sipolins, New York, NY (US); Jenna Reinen, Greenwich, CT (US); Ravi Tejwani, Cambridge, MA (US); Hui Wu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 16/297,644

(22) Filed: Mar. 9, 2019

(51) Int. Cl.
*G06F 3/01* (2006.01)

(52) U.S. Cl.
CPC ........ *G06F 3/011* (2013.01); *G06F 2203/012* (2013.01)

(58) Field of Classification Search
None
See application file for complete search history.

(56) References Cited

U.S. PATENT DOCUMENTS

| 9,067,097 | B2 | 6/2015 | Lane et al. | |
|---|---|---|---|---|
| 2006/0183601 | A1 | 8/2006 | Couvillion, Jr. et al. | |
| 2015/0070274 | A1* | 3/2015 | Morozov | G02B 27/017 345/156 |
| 2018/0224930 | A1 | 8/2018 | Folmer et al. | |
| 2019/0147237 | A1* | 5/2019 | Yao | G06F 3/011 382/103 |
| 2020/0033957 | A1* | 1/2020 | Bieglmayer | G06F 3/0346 |

OTHER PUBLICATIONS

Schwaiger, M. et al., "A Foot Following Locomotion Device with Force Feedback Capabilities", Proceedings of VIII Symposium on Virtual Reality, Belem, Brazil, pp. 309-321 (2006).

* cited by examiner

*Primary Examiner* — Nicholas J Lee
(74) *Attorney, Agent, or Firm* — Intelletek Law Group, PLLC; Gabriel Daniel, Esq.

(57) ABSTRACT

A virtual reality (VR) system for VR desk application that allows a user to move in a VR environment while sitting in front of a working desk is provided. The VR system receives sensor data from a mobile device. The VR system generates a set of sitting motion data by interpreting the received sensor data as a motion of a limb of a person in a sitting posture. The VR system maps the set of sitting motion data into a set of movements in the VR environment. The VR system renders the VR environment and presents the rendered VR environment.

20 Claims, 6 Drawing Sheets

LOCOMOTION IN VIRTUAL REALITY DESK APPLICATIONS

BACKGROUND

Technical Field

The present disclosure generally relates to Virtual Reality (VR).

Description of the Related Art

VR technology most commonly uses multi-projected environments to generate realistic images, sounds and other sensations that simulate a user's physical presence in a virtual or imaginary environment. A person using virtual reality equipment is able to "look around" the artificial world, move around in it, and interact with virtual features or items. The effect is commonly created by Head Mounted Display (HMD). VR desk applications are virtual reality applications involving the use of an HMD while the user is sitting in front of a working desk.

SUMMARY

Some embodiments of the disclosure provide a virtual reality (VR) system for VR desk applications that allow a user to move in a VR environment while sitting in front of a working desk. The VR system receives sensor data from a mobile device. The VR system generates a set of sitting motion data by interpreting the received sensor data as a motion of a limb of a person in a sitting posture. The VR system maps the set of sitting motion data into a set of movements or locomotion in the VR environment. The VR system renders the VR environment and presents the rendered VR environment.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

One of the challenges in Virtual Reality (VR) is locomotion, namely to make the user feel like he or she is moving naturally inside the VR environment. In order to reduce the cost and complexity of implementing locomotion in VR, some embodiments of the disclosure provide a VR system that allows a user to move in the VR environment while sitting in front of a working desk. In other words, the motions of a sitting user are used to drive locomotion in a VR desk application. In some embodiments, a mobile device placed in or near the user's side pocket is used to detect movement of a limb (e.g., thigh, leg, or foot) while the user is in a sitting posture.

In some embodiments, a sitting motion interpreter receives sensor data from a mobile device and generates a set of sitting motion data by interpreting the received sensor data as a motion of a limb in a sitting posture. The set of sitting motion data is mapped into a set of movements or locomotion in a VR environment. In other words, the sensor data is used to identify movements of a leg/foot/thigh in sitting posture and the identified movements are used to derive locomotion in the VR environment.

Figure 1:
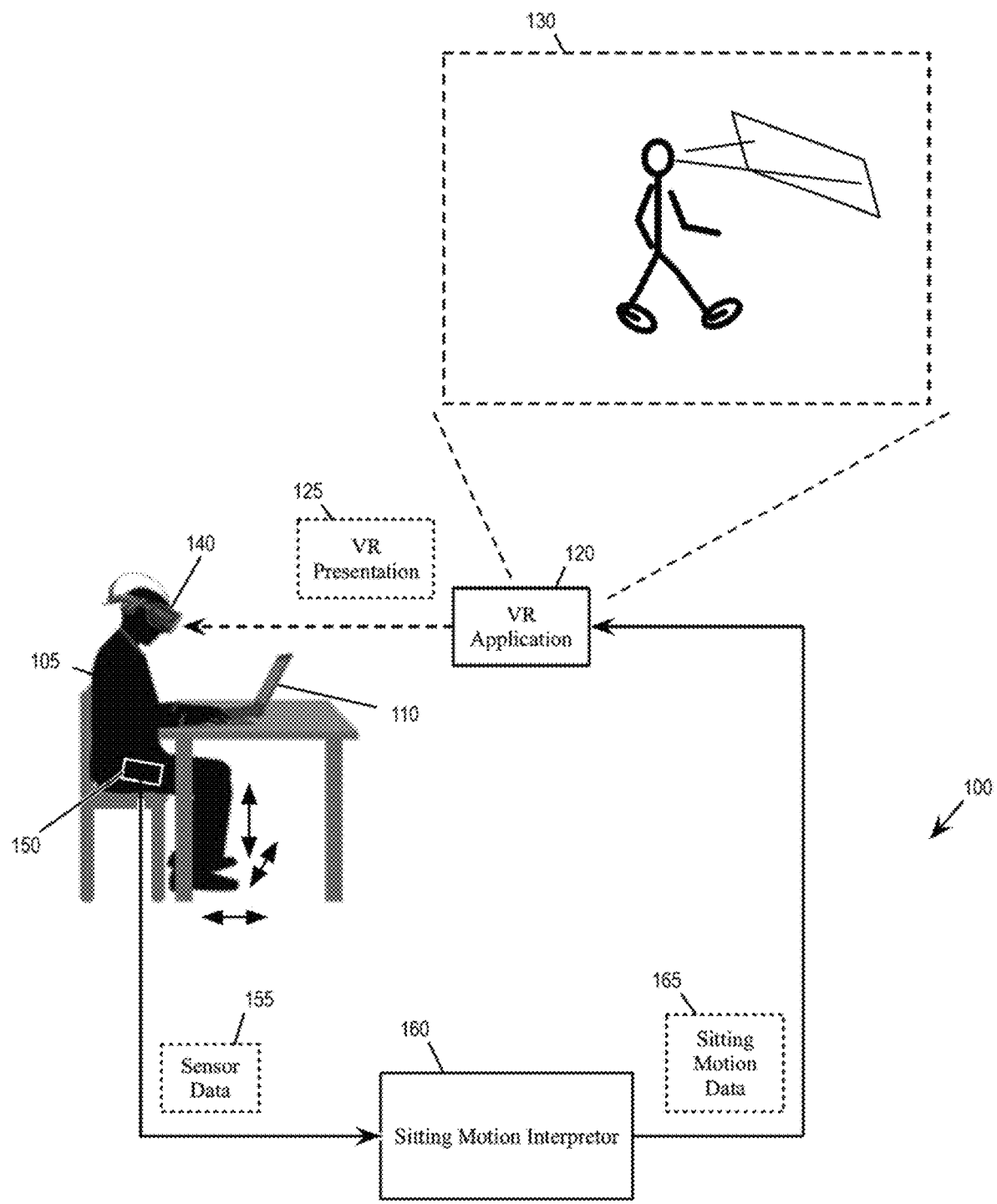
FIG. 1 illustrates a Virtual Reality (VR) system in which the motions of a sitting user is used to drive locomotion in a VR environment.

FIG. 1 illustrates a VR system 100 in which the motions of a sitting user is used to drive locomotion in a VR environment. As illustrated, the VR system 100 is a VR desk application system in which a user 105 is sitting at a desk and using a VR application 120.

The VR application 120 creates and maintains a VR environment 130. The VR application generates a VR presentation 125 of the VR environment 130 for the user 105 to perceive, interact, and experience. The VR presentation 125 may include visual, auditory, haptic, and other sensory components. The different sensory components of the VR presentation 125 may be presented to the user through VR presentation devices 140, which may include a computer monitor, a computer speaker, a HMD, etc.

The user may interact with the VR environment 130 through one or more input devices that convert the motions or gestures of the user 105 into input data for the VR application 120. The VR application 120 may use the input data to manipulate objects in the VR environment 130. The VR application 120 may also use the input data to control the locomotion of the user experience in the VR environment 130, e.g., by moving the perspective of the user, by moving an avatar representing the user, etc.

The VR system 100 is implemented by a computing device 110 and a mobile device 150. The computing device 110 runs the VR application 120. The computing device may be a desktop computer, a laptop computer, a tablet computer, a smartphone, a smartwatch, a personal digital assistant (PDA), or any other computing device or mobile device that is capable of maintaining a VR environment and rendering a VR presentation. The mobile device 150 is used as an input device for the VR system. The mobile device 150 may be smartphone, a smartwatch, or a personal digital assistant (PDA), or any other computing and communications device that can be carried or worn by the user.

The mobile device 150 senses its own physical movement to generate a set of corresponding sensor data 155. The sensor data 155 is relayed to the computing device 110 through wired or wireless transmission. The computing device 110 in turn uses the sensor data to derive locomotion for the VR environment 130.

As illustrated, the mobile device 150 is placed in a side pocket of the user. In other words, the mobile device is affixed near the hip or upper thigh of the user 105. Accordingly, the sensor data generated by the mobile device 150 reflect the movement of the leg/foot/thigh of the user. Furthermore, since the user 105 is sitting, the sensor data reflects the movement of the leg/foot/thigh of the user when the user is in a sitting posture.

The mapping of the sensor data leverages the fact (or assumption) that the mobile device is inside a sitting user's side pocket or that the sensor data is from an inertial sensor that is affixed near a upper thigh of a sitting person. Consequently, the VR system interprets the sensor data as being produced by an inertial sensor that is affixed near a upper thigh of a sitting person. Since the range of motion of a leg/foot/thigh in a sitting posture is limited, the VR system considers only a limited set of possibilities when interpreting the sensor data. This simplifies the mapping from the mobile device's sensor data to locomotion in the VR environment 130.

In some embodiments, the VR system 100 includes a sitting motion interpreter 160 that classifies the sensor data 155 according to a limited set of possible motions by a leg/foot/thigh in sitting posture. The sitting motion interpreter 160 receives sensor data 155 collected by the mobile device 150 and produces a set of sitting motion data 165 for the VR application 120. The sitting motion data 165 is provided to the VR application 120 to control the locomotion of the user experience in the VR environment 130.

Figure 2:
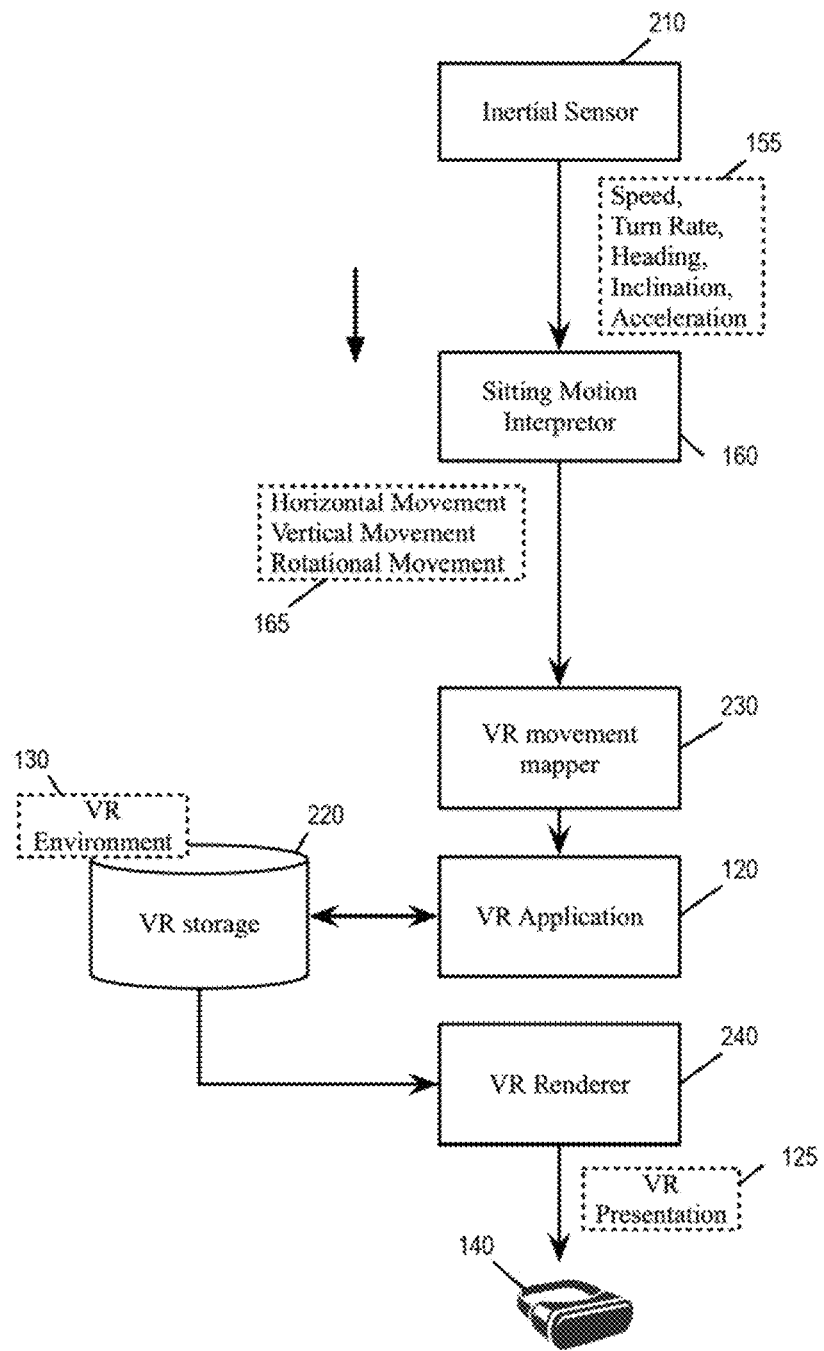
FIG. 2 illustrates a data flow of the VR system from a mobile device to a computing device through a sitting motion interpreter.

For some embodiments, FIG. 2 illustrates a data flow of the VR system 100 from the mobile device 150 to the computing device 110 through the sitting motion interpreter 160.

The mobile device 150 is equipped with an inertial sensor 210 to sense the motion of the mobile device. The inertial sensor may include an accelerometer, a gyroscope, and/or a magnetometer to generate the set of sensor data 155. The sensor data 155 may include speed, turn rate, heading, inclination, and acceleration detected by the inertial sensor 210.

The sitting motion interpreter 160 processes the sensor data 155 to generate the sitting motion data 165, which reports the motions of the user's leg/foot/thigh in the sitting posture, including various linear and rotational movements of the leg/foot/thigh. In some embodiments, the sitting motion interpreter 160 identifies the movements of the leg/foot/thigh by classifying the sensor data 155 according to several predetermined types of sitting motion. These predetermined types of sitting motion may include raising heel, raising toes, extending foot forward, retracting foot backward, swing left, swing right, crossing leg, etc. Some of these predetermined types of sitting motion are movement of a foot inferred from the sensor data 155. Sensor data that the sitting motion interpreter 160 cannot classify into one of the predetermined types of sitting motion may be ignored as noise. Thus, motions that are not performed in sitting posture, such as actual walking, running, or jumping are excluded from the predetermined types of sitting motion.

The computing device implements the VR application 120, a VR storage 220, a VR movement mapper 230, and a VR renderer 240. The computing device may also implement the sitting motion interpreter 160. The VR application 120 maintains the VR environment 130 by storing and updating various components of the VR environment 130 in the VR storage 220. The VR movement mapper 230 uses the sitting motion data 165 to derive locomotion in the VR environment 130 based on one or more requirements of the VR application 120. The VR renderer 240 generates the VR presentation 125 based on the current state of the VR environment 130 for presentation by the VR presentation devices 140.

In some embodiments, the sitting motion interpreter 160, the VR application 120, the VR storage 220, the VR movement mapper 230, and the VR renderer 240 are modules of software instructions being executed by one or more processing units (e.g., a processor) of the computing device 110. In some embodiments, the sitting motion interpreter 160, the VR application 120, the VR storage 220, the VR movement mapper 230, and the VR renderer 240 are modules of hardware circuits implemented by one or more integrated circuits (ICs) of an electronic apparatus. In some embodiments, the sitting motion interpreter 160 is implemented at the mobile device 150 that generates the sensor data 155 rather than at the computing device 110 that runs the VR application 120. Though the software or hardware modules of the computing device 110 are illustrated as being separate modules, some of the modules can be combined into a single module. For example, the functionalities of the VR movement mapper 230 and the VR renderer 240 can be merged with the VR application 120 as one module. An example computing device 600 that may implement the computing device 110 will be described by reference to FIG. 6 below.

As mentioned, the sitting motion interpreter 160 receives the sensor data 155 from the mobile device 150 and generates the sitting motion data 165 by interpreting the received sensor data as a motion of a limb in a sitting posture, which may include various linear and rotational movements of the limb. In other words, the received sensor data is used to identify the various linear and rotational movements of a leg/foot/thigh of a sitting person. The movements of the leg/foot/thigh are reported in the sitting motion data 165, which is then mapped to locomotion in the VR environment.

Figure 3:
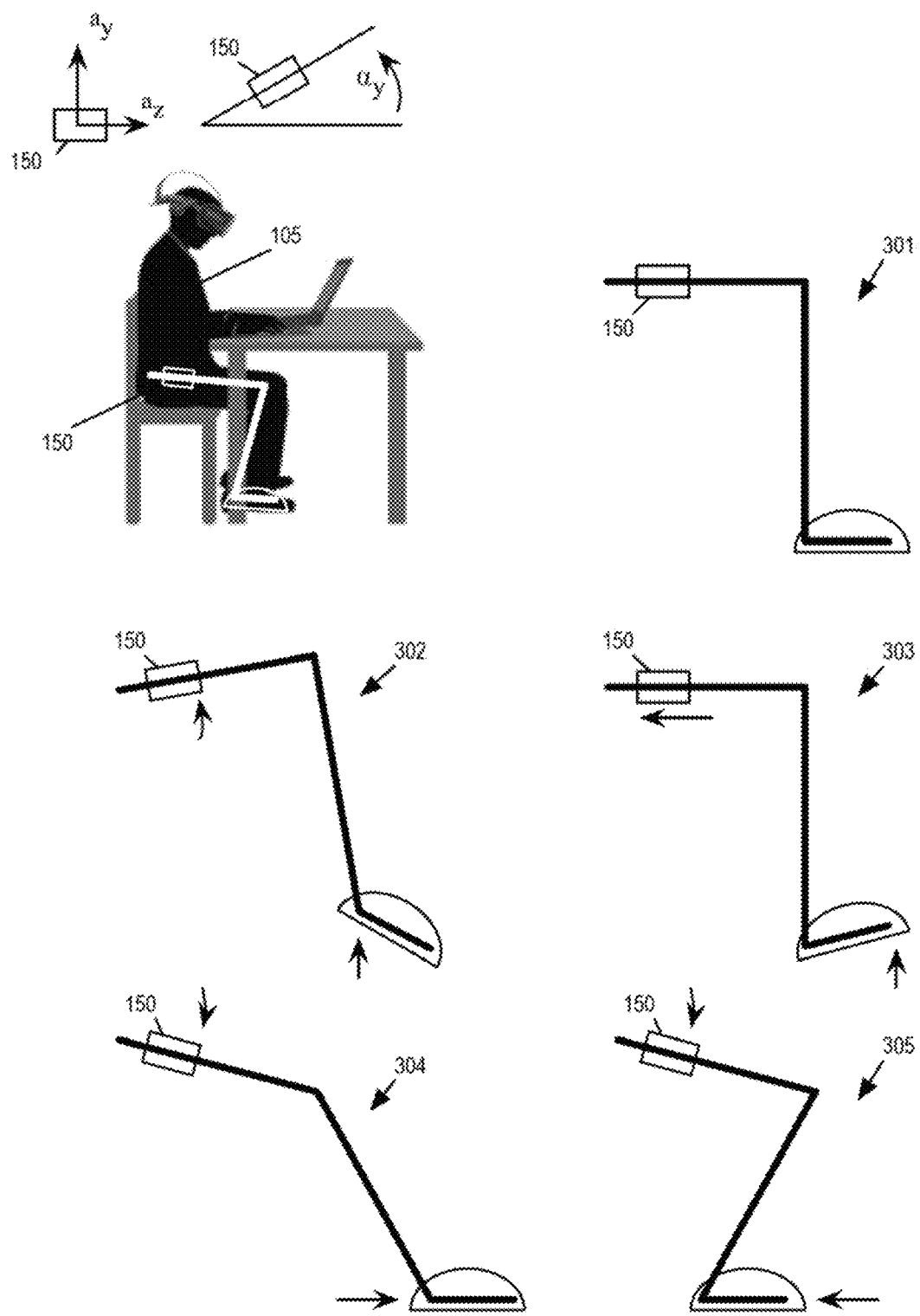
FIG. 3 illustrates using sensor data to identify vertical movements of a leg/foot/thigh in sitting posture and using the identified movements for locomotion in the VR environment, consistent with an exemplary embodiment.

FIG. 3 illustrates using sensor data to identify vertical movements of a leg/foot/thigh in sitting posture and using the identified movements for locomotion in the VR environment, consistent with an exemplary embodiment. As the user 105 moves his right foot up, down, forward, and backward, the inertial sensor in the mobile device 150 may sense up-and-down linear motion, front-and-back linear motion, as well as angular motion relative to the ground (illustrated as linear acceleration $a_y$, $a_z$, and angular acceleration $a_y$, respectively). These motion components are included in the sensor data 155, which is processed by the sitting motion interpreter 160. The sitting motion interpreter 160 uses the motion components $a_y$, $a_z$, and $a_y$ from the sensor data 155 to identify one of several predetermined types of sitting motion. These predetermined types of sitting motion may include rest (301), raising heel (302), raising toes (303), sliding foot forward (304), and sliding foot backward (305).

Figure 4:
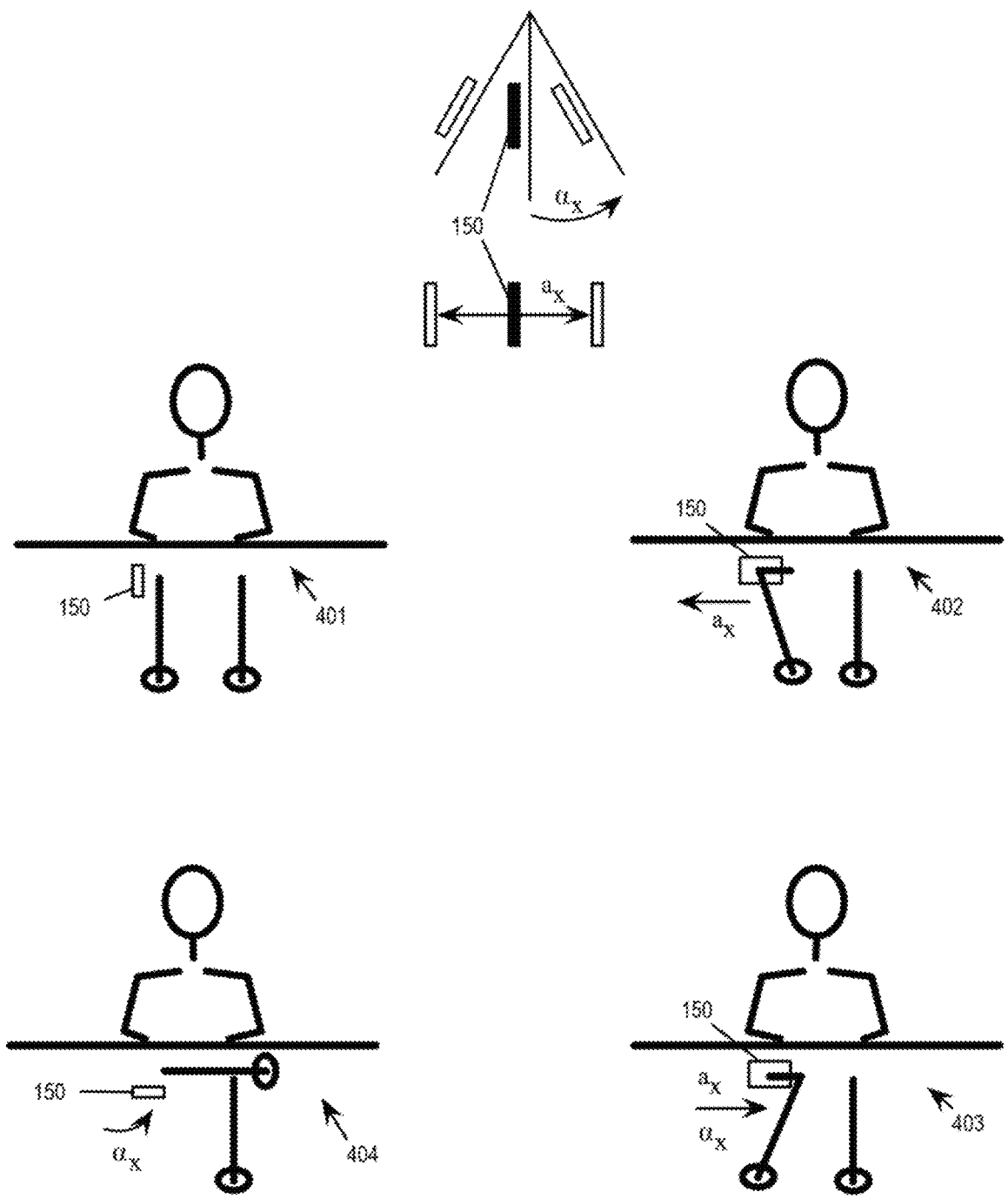
FIG. 4 illustrates using sensor data to identify horizontal movements of a leg/foot/thigh in sitting posture and using the identified movements for locomotion in the VR environment, consistent with an exemplary embodiment.

FIG. 4 illustrates using sensor data to identify horizontal movements of a leg/foot/thigh in sitting posture and using the identified movements for locomotion in the VR environment, consistent with an exemplary embodiment. As the user 105 swings his right thigh leftward or rightward, the inertial sensor in the mobile device 150 may sense left-and-right linear motion as well as angular motion relative to the center (illustrated as linear acceleration ax and angular acceleration ax, respectively). These motion components are included in the sensor data 155, which is processed by the sitting motion interpreter 160. The sitting motion interpreter 160 uses the motion components ax and ax from the sensor data 155 to identify one of several predetermined types of sitting motion. These predetermined types of sitting motion may include rest (401), swing-left (402), swing-right (403), and leg-cross (404).

The VR movement mapper 230 may map each of these types of sitting motion to a specific type of locomotion in the VR environment. For example, the VR movement mapper 230 may map raising heel (302) to jumping in the VR environment, swing-left (403) to left turns in the VR environment, and swing-right (402) to right turns in the VR environment. The VR movement may also map transitions between different types of sitting motion to a specific type of locomotion in the VR environment. For example, the VR movement mapper 230 may map repeated transitions between raising toes (303) and rest (301) to walking in the VR environment. Furthermore, a particular type of sitting motion may be mapped to different types of locomotion for different VR applications. For example, sliding foot back and forth may be mapped to running in a first VR environment and flying in a second VR environment.

Figure 5:
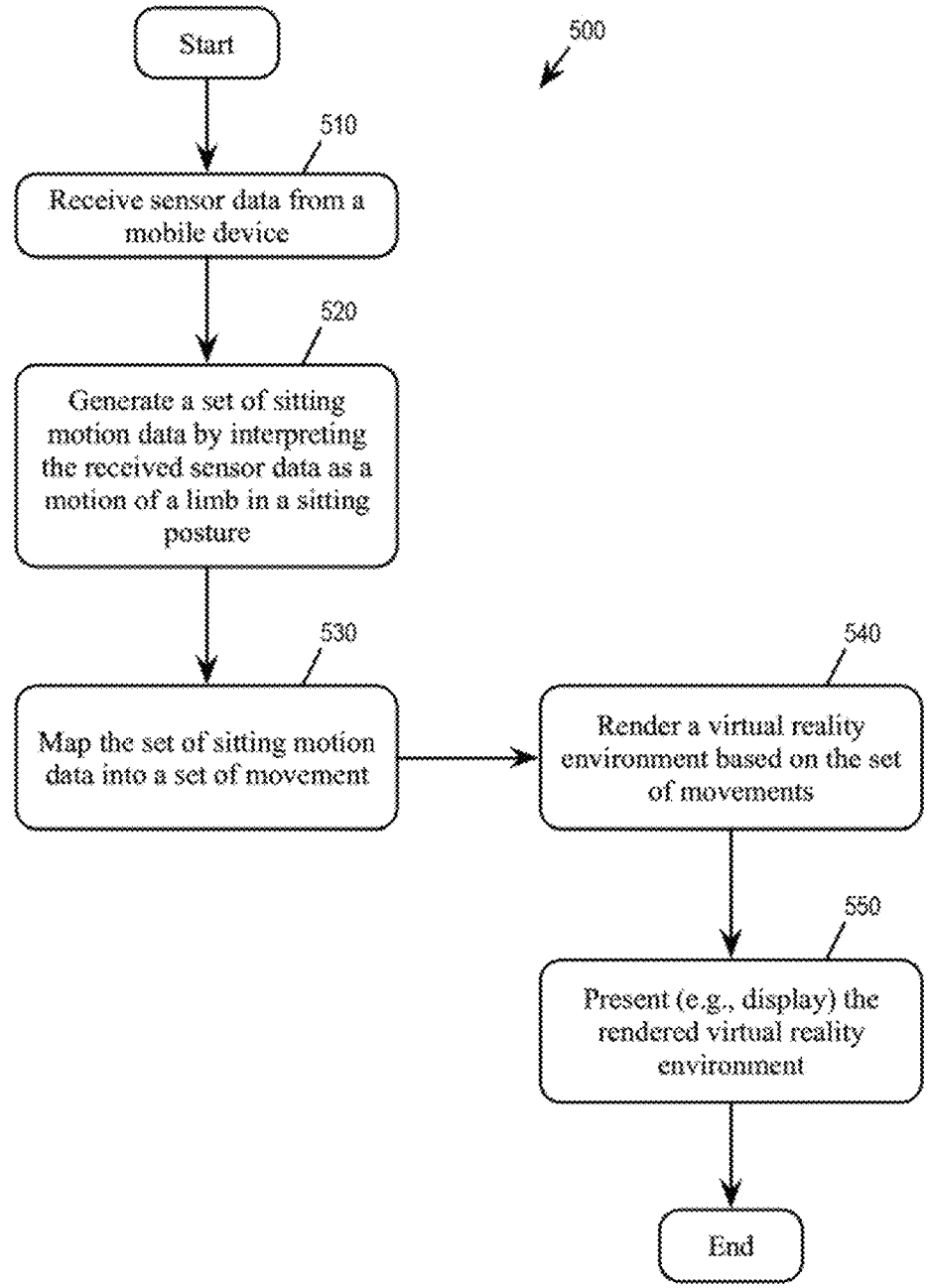
FIG. 5 conceptually illustrates a process for converting sensor data from a mobile device of a sitting user to locomotion in a VR environment, consistent with an exemplary embodiment.

FIG. 5 conceptually illustrates a process 500 for converting sensor data from a mobile device of a sitting user to locomotion in a VR environment, consistent with an exemplary embodiment. In some embodiments, one or more processing units (e.g., processor) of a computing device implementing the sitting motion interpreter 160 (e.g., the computing device 110 in the VR system 100) performs the process 500 by executing instructions stored in a computer readable medium.

The process 500 starts when the computing device receives (at step 510) sensor data from a mobile device. The sensor data may be generated by an inertial sensor and may include speed, turn rate, heading, inclination, and acceleration of the mobile device. The mobile device may be affixed near the hip or upper thigh of a user who is sitting (e.g., placed in the user's pocket) such that the sensor data generated by the mobile device reflect the movement of a limb (e.g., leg/foot/thigh) of the user when the user is in a sitting posture.

The computing device generates (at step 520) a set of sitting motion data by interpreting the received sensor data as a motion of a limb in a sitting posture. In some embodiments, the sensor data is used to identify movements of a leg/foot/thigh in sitting posture. In some embodiments, the computing device classifies the sensor data according to a limited set of predetermined types of sitting motion that are possible when the user is sitting, such as raising the heel, raising the toes, kicking foot forward, retracting foot backward, swing left, swing right, crossing leg, etc. In some embodiments, motions that are not performed in sitting posture, such as actual walking, running, or jumping are excluded from the predetermined types of sitting motion. The set of sitting motion data reports which types of sitting motion are detected.

The computing device maps (at step 530) the set of sitting motion data into a set of movement. The computing device renders (at step 540) a VR environment based on the set of movements. The computing device may map each type of sitting motion to a specific type of locomotion in the VR environment. The computing device may also map transitions between different types of sitting motion to a specific type of locomotion in the VR environment.

The computing device presents (at step 550) the rendered VR environment into a VR presentation. The VR presentation may include visual, auditory, haptic, and other sensory components. The different sensory components of the VR presentation are presented to the user through VR presentation devices such as an HMD.

By limiting the interpretation of sensor data to only motions of a thigh/leg/foot of a sitting user, the implementation of locomotion in a VR environment is greatly streamlined for VR desk application. The complexity and cost of implementing such a VR system is therefore greatly reduced. Furthermore, since the mobile device is only used to sense sitting motions rather than all possible bodily motions, the use of the sensor data from the mobile device as locomotion is more immune to noise.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
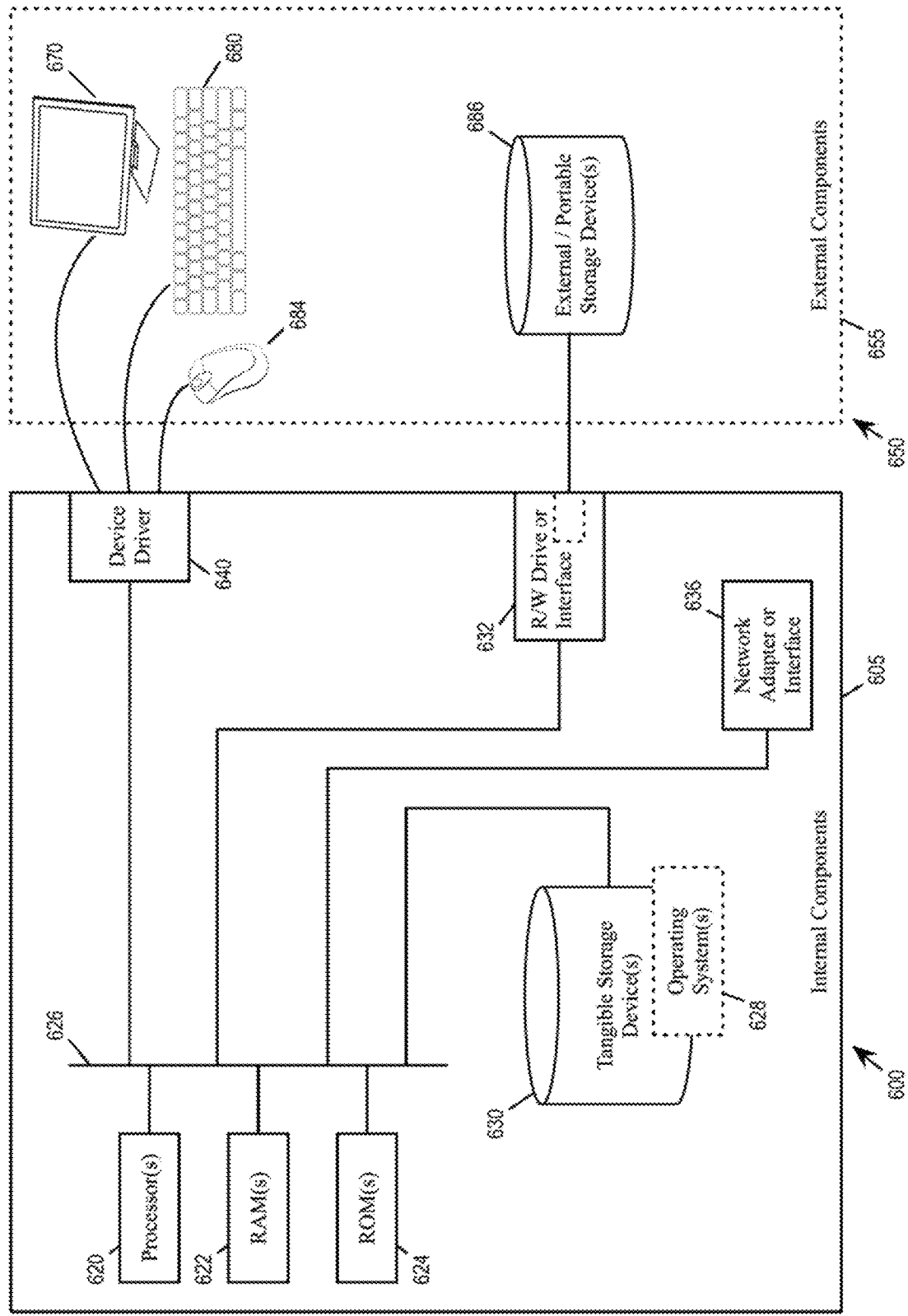
FIG. 6 shows a block diagram of the components of a data processing system in accordance with an illustrative embodiment of the present disclosure.

FIG. 6 shows a block diagram of the components of data processing systems 600 and 650 that may be used to implement a VR system in which the motions of a sitting user are used to drive locomotion in a VR application, in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the process 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the process 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

The foregoing one or more embodiments implement a VR system within a computer infrastructure by having one or more computing devices processing sensor data from a mobile device into a set of sitting motion data. The computer infrastructure is further used to map the sitting motion data into locomotion in a VR environment for a VR desk application.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:

receiving sensor data from a mobile device;
generating a set of sitting motion data by interpreting the received sensor data as a motion of a limb of a person in a sitting posture;
mapping the set of sitting motion data into a set of movements in a virtual reality environment;
rendering the virtual reality environment; and
presenting the rendered virtual reality environment.

2. The computing device of claim 1, wherein interpreting the received sensor data comprises using the received sensor data to identify movements of the limb of the person in sitting posture.

3. The computing device of claim 1, wherein interpreting the received sensor data comprises identifying one of a set of predetermined types of sitting motion based on the received sensor data.

4. The computing device of claim 3, wherein mapping the set of sitting motion data into the set of movements in the virtual reality environment comprises mapping each predetermined type of sitting motion into a type of movement in the virtual reality environment.

5. The computing device of claim 3, wherein the set of predetermined types of sitting motion exclude motions that are not performed when in sitting posture.

6. The computing device of claim 1, wherein the received sensor data is from an inertial sensor that is affixed near a upper thigh of a sitting person.

7. The computing device of claim 1, wherein interpreting the received sensor data comprises inferring movements of a foot from the received sensor data.

8. The computing device of claim 1, wherein the received sensor data is interpreted as horizontal and vertical movements of the limb.

9. A computer-implemented method comprising:
receiving sensor data from a mobile device;
generating a set of sitting motion data by using the received sensor data to identify movements of a limb of a person in sitting posture;
mapping the set of sitting motion data into a set of movements in a virtual reality environment;
rendering the virtual reality environment; and
presenting the rendered virtual reality environment.

10. The computer-implemented method of claim 9, wherein interpreting the received sensor data comprises identifying one of a set of predetermined types of sitting motion based on the received sensor data.

11. The computer-implemented method of claim 10, wherein mapping the set of sitting motion data into the set of movements in the virtual reality environment comprises mapping each predetermined type of sitting motion into a type of movement in the virtual reality environment.

12. The computer-implemented method of claim 10, wherein the set of predetermined types of sitting motion exclude motions that are not performed in the sitting posture.

13. The computer-implemented method of claim 9, wherein the received sensor data is from an inertial sensor that is affixed near a upper thigh of a sitting person.

14. The computer-implemented method of claim 9, wherein the received sensor data is interpreted as linear and rotational movements of the limb.

15. A computer program product comprising:
one or more non-transitory computer-readable storage devices and program instructions stored on at least one of the one or more non-transitory storage devices, the program instructions executable by a processor, the program instructions comprising sets of instructions for:

receiving sensor data from a mobile device;

generating a set of sitting motion data by using the received sensor data to identify movements of a limb of a person in sitting posture;

mapping the set of sitting motion data into a set of movements in a virtual reality environment;

rendering the virtual reality environment; and presenting the rendered virtual reality environment.

16. The computer program product of claim 15, wherein interpreting the received sensor data comprises identifying one of a set of predetermined types of sitting motion based on the received sensor data.

17. The computer program product of claim 16, wherein mapping the set of sitting motion data into the set of movements in the virtual reality environment comprises mapping each predetermined type of sitting motion into a type of movement in the virtual reality environment.

18. The computer program product of claim 16, wherein the set of predetermined types of sitting motion do not include motions that are impossible in the sitting posture.

19. The computer program product of claim 15, wherein the received sensor data is from an inertial sensor that is affixed near a upper thigh of a sitting person.

20. The computer program product of claim 15, wherein the received sensor data is interpreted as horizontal and vertical movements of the limb.

* * * * *